UNITED STATES PATENT OFFICE.

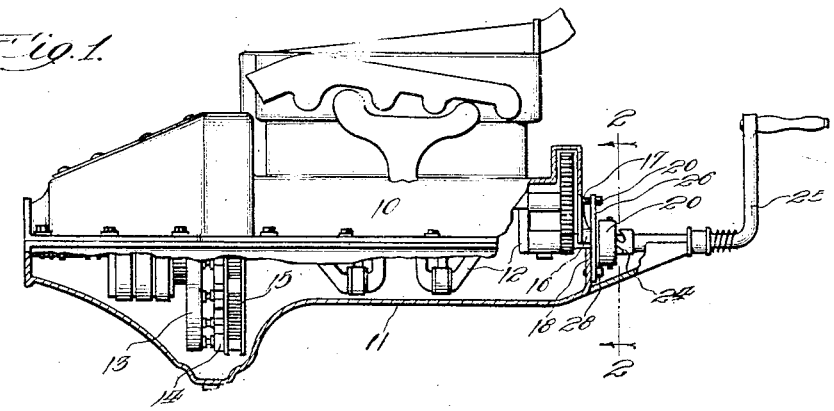

CLARENCE C. FULLER, OF LOXLEY, ALABAMA, ASSIGNOR OF ONE-FIFTH TO HOWARD E. FULLER, ONE-FIFTH TO FRED C. GRIFFIN, ONE-FIFTH TO EDWARD L. HILES, AND ONE-FIFTH TO WILLIAM J. FREDERICK, ALL OF LOXLEY, ALABAMA.

THRUST-BEARING FOR INTERNAL-COMBUSTION ENGINES.

1,395,043.

Specification of Letters Patent. Patented Oct. 25, 1921.

Application filed July 14, 1920. Serial No. 396,224.

*To all whom it may concern:*

Be it known that I, CLARENCE C. FULLER, a citizen of the United States, residing at Loxley, in the county of Baldwin and State of Alabama, have invented certain new and useful Improvements in Thrust-Bearings for Internal-Combustion Engines, of which the following is a specification.

The thrust bearing of this invention is designed with particular reference to the structural requirements of a Ford engine and with a view to the application of the bearing to the forward end of the crank shaft without disassembling the engine or disturbing the relation of any of its operating parts.

In the construction of a Ford engine it is the practice to utilize the fly wheel of the engine as a mounting for certain of the elements comprised in the magneto structure, which rotating elements are presented in face-wise relation to the complementary stationary elements of the magneto structure, the relation being such that any appreciable end play in the crank shaft will result in a displacement of the magneto elements to a degree which may seriously impair the operation of the magneto. It is thus apparent that in an engine of this character it is of primary importance to make provision against end thrust, and said invention is designed to accomplish the above purpose.

In the drawings:

Figure 1 is a side elevation of a Ford engine showing the crank case partially broken away, and showing the thrust bearing of the present invention located in interposed relation between the fan pulley and the forward end of the engine casing;

Fig. 2 is a front view of the bearing plate; and

Fig. 3 is a sectional elevation thereof showing its relation to the fan pulley and associated parts.

The Ford engine for which the thrust bearing is intended comprises a cylinder block 10 and a crank case 11, within which is located a crank shaft 12. The crank shaft near its rear end has mounted thereon a fly wheel 13 carrying rotating magnets 14 which are presented in face-wise relation to a stationary field 15. The crank shaft, at its forward end, passes through a bearing 16 formed in part in the front closing plate 17 of the engine casing and in part in the forward wall 18 of the crank casing. The closing plate is secured to the engine casing proper by means of a regulation bolt 19 and a cap screw 20, the latter of which is special to the present construction, and its lower edge abuts against the upper edge of the forward wall of the crank casing, as indicated in Fig. 2. In front of the closing plate 17 is located a fan pulley 21 which is mounted on the shaft 12, which fan pulley is recessed at its forward face 21ª and is provided with a hub 22 secured to the shaft by means of a short cross pin 22ª. A second pin 23 at right angles to the first serves to afford engagement for the ratchet head 24 of the crank 25 by which the engine is started. The above details are all standard in the present Ford engine and additional description thereof is not deemed necessary.

In order to provide against any end thrust which might disturb the relation of the magneto elements and also interfere with the smooth operation of the engine, a bearing plate 26 is provided, which is positioned in place on the shaft 12 by removing the fan pulley 21. The plate is preferably, although not necessarily, of generally circular formation, and is provided on its upper side with an upstanding ear 27 through which the special cap screw 20 is entered into the regulation hole in the front plate 17 of the crank case, and this bolt, in conjunction with a second bolt or set screw 28 serves to securely fasten the plate in the intended position, the arrangement being one which permits the use of shims or the like between the plate and the front of the crank case when necessary to maintain the shaft in its proper position.

The plate on its forward face is provided with a recess 29 concentrically formed with respect to the aperture 30 through which the crank shaft 12 projects, which recess coöperates with a similarly formed recess 31 on the inner face of the fan pulley 21. The two recesses jointly furnish sockets for the reception of inner and outer bearing rings 32 and 33 respectively which afford a runway for the reception of balls 34, thereby affording a ball thrust bearing which prevents end play in the shaft, and particularly prevents the magneto elements from being moved from their intended positions in definitely spaced relationship to one anoher. It will in all cases be found necessary to utilize a pulley specially formed and positioned to provide for the interposition of the thrust bearing, but aside from the substitution of a specially formed pulley no change or modification in the engine structure will be required to adapt the same to the requirements of the present invention.

The invention is one which may be employed as an adjunct or accessory, in that its utilization requires no material disassembling or rearranging of the engine structure and may be readily and quickly secured in place in a position which is easy of access, which features are of material importance in devices of the accessory class.

I claim:

1. In a device of the class described, the combination of an engine casing, a crank shaft having its forward end protruding through the engine casing, a fan pulley fixedly mounted upon the protruding end of the crank shaft and circularly recessed on its rear face, a thrust bearing plate interposed between the fan pulley and the contiguous forward end of the engine casing and rigidly secured to the latter in a manner to permit variations of the bearing plate with respect to the engine casing, said plate being provided in its forward face with a recess coöperating with the recess in the fan pulley, and ball bearing members housed within said recesses, substantially as described.

2. In a device of the class described, the combination of an engine casing, a crank shaft having its forward end protruding through the engine casing, a fan pulley fixedly mounted upon the protruding end of the crank shaft and circularly recessed on its rear face, a thrust bearing plate interposed between the fan pulley and the contiguous forward end of the engine casing and rigidly secured to the latter in a manner to permit variations of the bearing plate with respect to the engine casing, said plate being provided in its forward face with a recess coöperating with the recess in the fan pulley, ball bearing members housed within said recesses, and a magneto consisting in part of elements rotating with the crank shaft and in part of elements held in fixed relation and in face-wise proximity to said rotating elements, substantially as described.

3. In a device of the class described, the combination of an engine casing, a crank shaft having its forward end protruding through the engine casing, a fan pulley mounted upon the protruding end of the crank shaft, a thrust bearing plate interposed between the fan pulley and the contiguous forward end of the engine casing, said plate being secured by a lower bolt and an upper cap screw in a manner adapted to permit variations in the positioning of the bearing plate with respect to the engine casing, ball bearing members interposed between the fan pulley and the thrust bearing plate, and a magneto consisting in part of elements rotating with the crank shaft and in part of elements held in fixed relation to said rotating elements, substantially as described.

CLARENCE C. FULLER.